United States Patent
Palisse et al.

(10) Patent No.: US 11,341,244 B2
(45) Date of Patent: May 24, 2022

(54) METHOD AND DEVICE FOR DETECTING ENCRYPTION, IN PARTICULAR FOR ANTI-RANSOMWARE SOFTWARE

(71) Applicants: INRIA INSTITUT NATIONAL DE RECHERCHE EN INFORMATIQUE ET EN AUTOMATIQUE, Le Chesnay (FR); ETAT FRANÇAIS, REPRÉSENTÉ PAR LE DÉLÉGUÉ GÉNÉRAL POUR L'ARMEMENT, Paris (FR)

(72) Inventors: Aurélien Palisse, Poitiers (FR); Jean-Louis Lanet, Aixe sur Vienne (FR); Colas Le Guernic, Rennes (FR); David Lubicz, Servon sur Vilaine (FR)

(73) Assignees: INRIA INSTITUT NATIONAL DE RECHERCHE EN INFORMATIQ, Le Chesnay (FR); ÉTAT FRANÇAIS, REPRÉSENTÉ PAR LE DÉLÉGUÉ GÉNÉRAL P, Paris (FR)

( * ) Notice: Subject to any disclaimer, the term of this patent is extended or adjusted under 35 U.S.C. 154(b) by 13 days.

(21) Appl. No.: 16/963,149

(22) PCT Filed: Jan. 16, 2019

(86) PCT No.: PCT/FR2019/050087
§ 371 (c)(1),
(2) Date: Jul. 17, 2020

(87) PCT Pub. No.: WO2019/141940
PCT Pub. Date: Jul. 25, 2019

(65) Prior Publication Data
US 2020/0342104 A1    Oct. 29, 2020

(30) Foreign Application Priority Data
Jan. 19, 2018    (FR) ...................................... 1850446

(51) Int. Cl.
*G06F 21/00* (2013.01)
*G06F 21/56* (2013.01)

(52) U.S. Cl.
CPC .......... *G06F 21/567* (2013.01); *G06F 21/561* (2013.01); *G06F 21/566* (2013.01); *G06F 2221/033* (2013.01)

(58) Field of Classification Search
CPC .... G06F 21/567; G06F 21/561; G06F 21/566; G06F 21/50; G06F 21/52; G06F 21/56; G06F 21/577; G06F 2221/033
See application file for complete search history.

(56) References Cited

U.S. PATENT DOCUMENTS

| | | |
|---|---|---|
| 2015/0058987 A1 | 2/2015 | Thure et al. |
| 2018/0007069 A1* | 1/2018 | Hunt ................... H04L 63/1416 |

(Continued)

OTHER PUBLICATIONS

Palisse, et al., "Data Aware Defense (DaD): Towards a Generic and Practical Ransomware Countermeasure," International Conference on Simulation, Modeling, and Programming for Autonomous Robots, 2017, pp. 192-208.

*Primary Examiner* — Edward Zee
(74) *Attorney, Agent, or Firm* — Maynard, Cooper & Gale, P.C.; Brian Sattizahn (57) ABSTRACT

Method and device for detecting encryption, in particular for anti-ransomeware software. The invention relates to a device for detecting encryption, comprising a computer (1) with a central processing unit (4) and a memory, which comprises a random-access memory (9) and a mass memory unit (6) comprising files. The central processing unit (4) cooperates with the random-access memory (9) and with an operating system (10) which comprises a core (12) and which is capable of having processes (18) carried out by the central processing unit (4); said processes (18) are divided into wires (20) and may comprise functions for accessing the (Continued)

files. A statistical model for ordinary writing to the header of a file is stored in the memory (6, 9). The device comprises a monitoring program (32) which is active in the core (12) and which is provided to:—recover (30) the write requests (24) in a file (8), said write requests (24) being transmitted by each wire (20), such requests (24) comprising, as an argument, a string of characters to be written,—calculate a first deviation value as a function of the portion of the string of characters relating to the header of the file and the statistical model for writing to the header, then—deliver a first warning if the first deviation value exceeds a first threshold.

10 Claims, 5 Drawing Sheets

(56) References Cited

U.S. PATENT DOCUMENTS

| 2018/0018458 A1 | 1/2018 | Schmugar |
| 2018/0020013 A1 | 1/2018 | Yoshikawa et al. |

\* cited by examiner

METHOD AND DEVICE FOR DETECTING ENCRYPTION, IN PARTICULAR FOR ANTI-RANSOMWARE SOFTWARE

The invention relates to a device for detecting encryption, applicable in particular to the detection of ransomware software, which will be called here "ransomware".

If the ransomware is relatively old (the first referenced dates from 1989: "PC Cyborg Trojan"), their use has exploded with the rise of internet. Particularly, in 2017, the ransomware "WannaCry" is rumoured to have allowed to extort almost $100,000 US, infecting nearly 300,000 computers in more than 150 countries. Infections by ransomware on smartphones are said to have jumped by more than 250% in 2017 alone, and around 20,000 computers would be infected every month in France by a ransomware.

A ransomware works by systematically and very quickly encrypting a large number of files in a machine, with an encryption code known to its sole designer, who offers decryption countermeasures at a very high price, for "ransom".

As will be seen below, the known anti-ransomware software works according to approaches which are not really satisfactory, either because they are incomplete or because they lead to heavy processing, and these processing can be easily detected by a ransomware.

The present invention improves the situation.

For these purposes, the invention starts from a computer device, comprising, in known manner, a computer with a central processing unit and a memory, which comprises a random-access memory and a mass memory comprising files. The central unit cooperates with the random-access memory, and with an operating system which has a kernel and is capable of executing processes by the central unit, cut into threads, which may comprise functions for accessing files.

To carry out an encryption detection, a statistical model of ordinary file header writing is stored in the memory, and the device comprises a sentinel program active at the kernel and arranged to:

retrieve for each thread the emitted file write requests, such requests comprising a character string to be written as argument,
  calculate a first deviation quantity according to the part of the character string relating to the header of the file and according to the statistical model for header writing, then
  issue a first warning if the first deviation quantity exceeds a first threshold.

In a variant, the sentinel program (P) can also issue a second warning if the first deviation quantity is greater than a second threshold, less than the first threshold. In an implementation of this variant, the sentinel program (P) can be arranged to:

a) define a critical quantity derived from the first deviation quantity,
  b) neutralise the thread when the critical quantity exceeds the first threshold,
  c) place the thread under monitoring when the critical quantity exceeds the second threshold but not the first threshold, and
  for a thread which is already under monitoring,
  d) duplicate all the parts of the file targeted by a write request of such a thread, and
  e) stop monitoring the thread if, at the end of a time period T, the thread has not emitted a write request whose critical quantity is greater than the second threshold.

This neutralisation of a thread can comprise at least one of the actions of the group which comprises: killing the thread, blocking the thread, insulating the thread.

Alternatively, the statistical model can be represented by a probability law P, and the calculation of the first deviation quantity then comprises the calculation of a likelihood relative to this probability law of the statistical model.

In an implementation of the previous variant, the probability law P can comprise a law of distribution of m-bit strings of in the file headers of a predetermined corpus of files, where m is a strictly positive integer less than the maximum header size of the files of said predetermined corpus.

Alternatively, the sentinel program is also arranged to:
  calculate a quantification quantity of the randomness of the character string,
  calculate a second deviation quantity, derived from the first deviation quantity and the quantification quantity of the randomness, and
  repeat steps b) and c) using the second deviation quantity as critical quantity.

In a particular implementation of the previous variant, calculating the quantification of the randomness can comprise calculating a chi-square of a left truncation of the character string.

The invention further provides an encryption detection method, comprising the following operations:
  a) providing a statistical model of ordinary header writing,
  b) retrieving for each thread the emitted file write requests, such requests comprising a character string to be written as argument,
  c) calculating a first deviation quantity according to the part of the character string relating to the header of the file and of the statistical model for header writing, then
  d) issuing a first warning if the first quantity exceeds a first threshold.

Alternatively, the encryption detection method can be characterised in that operation d) further comprises:
  d2) issuing a second warning if the first deviation quantity is greater than a second threshold, less than the first threshold.

In an implementation of the previous variant, the encryption detection method can comprise the following operations:
  e) defining a critical quantity derived from the first deviation quantity,
  f) neutralising the thread when the critical quantity exceeds the first threshold,
  g) placing the thread under monitoring when the critical quantity exceeds the second threshold but not the first threshold, and
  for a thread which is already under monitoring,
  h) duplicating all the parts of the file targeted by a write request of such a thread,
  and
  i) stopping the monitoring of the thread if, at the end of a time period T, the thread has not emitted a write request whose critical quantity is greater than the second threshold.

The operations h) and i) can be carried out in parallel with operations c) to g).

In a particular implementation of the previous variant, the encryption detection method can be characterised in that the neutralisation of a thread comprises at least one of the actions of the group which comprises: killing the thread, blocking the thread, insulating the thread, Alternatively, the encryption detection method can be characterised in that operation a) comprises providing a probability law P representing the statistical model, and in that the calculation of the first deviation quantity comprises the calculation of a likelihood relative to this probability law of the statistical model.

In a particular implementation of the previous variant, the probability law P can comprise a law of distribution of m-bit strings in the file headers of a predetermined corpus of files, where m is a strictly positive integer less than the maximum header size of the files of said predetermined corpus.

Also, the method can further comprise the following operations:
 calculating a quantification quantity of the randomness of the character string,
 calculating a second deviation quantity, derived from the first deviation quantity and the quantification quantity of the randomness, and
 repeating steps e) to g) using the second deviation quantity as critical quantity.

In a particular implementation of the previous variant, calculating the quantification of the randomness comprises calculating a chi-square of a left truncation of the character string.

Moreover, the encryption detection can be applied as a countermeasure to ransomware software.

Other features and advantages of the invention will appear better upon reading the description which follows, derived from examples given in an illustrative and a non-limiting manner, derived from the drawings wherein.

The drawings and the description below essentially contain elements of a certain nature. They can therefore not only serve to better understand the present invention, but also contribute to its definition, if necessary.

Figure 1:
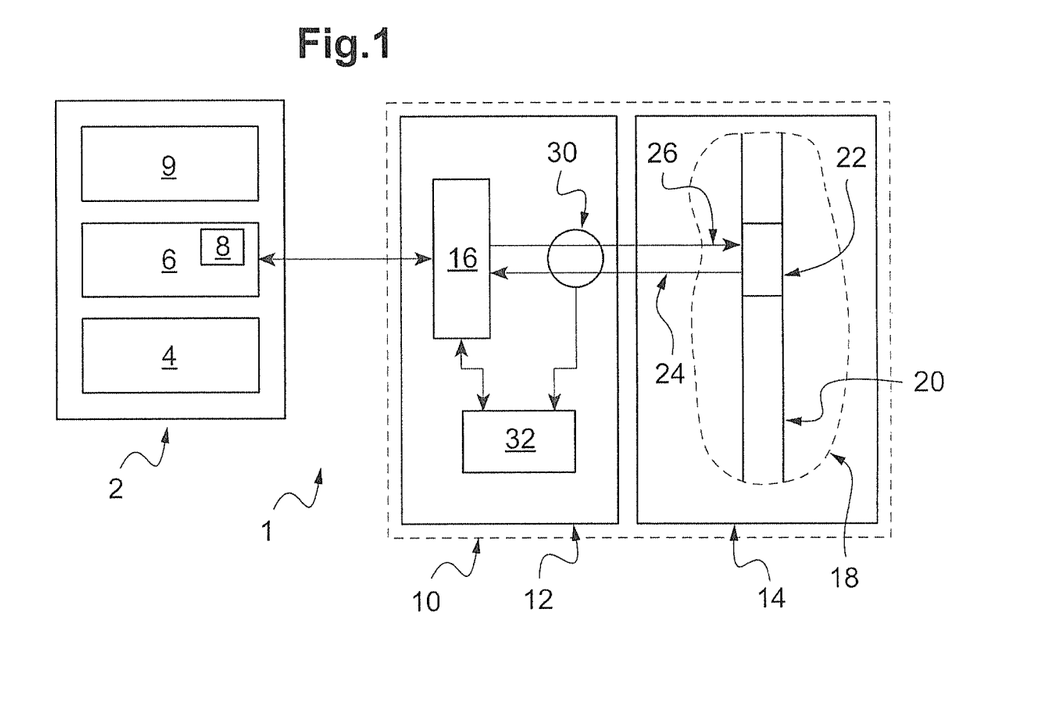
FIG. 1 shows a general view of a computer according to the invention.

FIG. 1 shows a general view of a computer 1 according to the invention.

The computer 1 comprises a machine 2, comprising a central unit 4 and a mass memory 6 suitable for storing files generically designated by the reference 8.

The central unit 4 cooperates with an operating system 10, which comprises a core or kernel and programs.

The computer also comprises a system memory, which includes a random-access memory (RAM). A swap space can be provided with the mass memory, if it is necessary to increase the system memory.

The operating system stored in the mass memory loads into the system memory. It defines therein a kernel space 12, where the kernel works, and one or more user spaces 14. The kernel space 12 ensures the separation of the user spaces from each other. It also comprises a memory manager 16, which performs the management of the access requests (write and/or read) to files 8 of the mass memory. The memory manager comprises a file management system (or "File System").

In the case where Microsoft Windows™ is used as operating system 10, the file system can be:
 the file system NTFS (New Technology File System) for the recent operating systems (from Microsoft Windows™ NT, NT 3.1, Microsoft Windows™ 2000 and their successors (XP, Vista, 7, etc.)), or
 a file allocation table (called FAT) for older versions of the operating system.

The kernel and user spaces in an operating system are also called "protection rings" (or "rings"). Each ring is associated with a certain number of permissions, privileges and priorities. The rings are further successively included in each other, which can create a hierarchy, from the highest level of privilege to the lowest level of privilege.

In the Microsoft Windows™ operating system, the kernel is typically in ring 0 and the user spaces in ring 3. Windows a priori contains 4 rings, with intermediate processes in rings 1 and 2.

Each user space 14 and the kernel space can execute processes 18 cut into threads 20 comprising instructions 22, including write requests, such as 24. The thread 20 sends a write request 24 to the memory manager 16. The latter responds with a request return 26 indicating whether the request has been executed or not. This return may comprise other details about the execution of the request.

In a known manner, the kernel executes a system probe 30 (or HIDS "Host Intrusion Detection System" probe). The HIDS probe 30 has the function of duplicating all the system calls of the user threads 20, in priority and in a transparent manner, that is to say without being detectable by a user thread 20. Here, the HIDS probe will duplicate without executing the write requests, that is to say duplicate the content of the write requests but without executing them. Thereafter, duplicate a write request and duplicate without having it executed will be designated indifferently. Likewise, a request and its content will be designated indifferently, except when the distinction is significant.

To combat this ransomware, anti-ransomware software can operate conventionally by detecting a signature specific to the ransomware. This only works for ransomware already listed. They can also monitor calls to encryption libraries (e.g., CryptoAPI), for example using a HIDS probe. But it does not work if the ransomware embeds its own encryption system.

Anti-ransomware software can still systematically analyse all write requests using a HIDS probe, and duplicate, at least temporarily, at least some of the files subject to write requests, to keep an unencrypted version thereof. But it is an extremely heavy processing.

Thus, the known anti-ransomware software approaches are not really satisfactory, because they are incomplete, and/or lead to heavy processing, which can be easily detected by the ransomware.

According to the invention, the kernel executes an anti-ransomware software program 32, which will be called here sentinel program. The HIDS probe transmits to this sentinel program 32 all write requests so that the sentinel program 32 can analyse them, and act on the user threads 20 in the event of a threat.

Being placed at the kernel, the sentinel program 32 and the HIDS probe 30 have priority over all the threads 20 of the user space. The sentinel program 32 can also, in turn, emit write requests 24.

The code of the HIDS probe 30 depends on the operating system 10 of the computer 1 to be protected.

Thus, under a Microsoft Windows™ system, Microsoft provides the developers with a development infrastructure (or working environment, called WDK) of file system drivers ("file System drivers framework"), called "File System Minifilter Drivers" (FSMD). Each FSMD driver has an "altitude", which corresponds to a certain level of privileges.

The development environment provided by Microsoft (i.e., WDK) allows to produce a HIDS probe with a driver of the type: file System minifilter. It is also possible to develop a similar probe with a recoded "legacy filter driver".

On the Mac OS X platform, it is also possible to develop a probe, by monitoring the inputs/outputs from the user space. If it is desired to work from the kernel, unofficial solutions are available on github.

For recent versions of Linux (Linux 4.1 LTS and more), the HIDS probe can comprise the BCC (for BPF Compiler Collection) tool. This HIDS probe is designed for Linux instruments kernel code from the user space. The most convenient method to implement it is to develop a modified kernel module that intercepts the desired system calls. It is also possible to directly modify the source code of the file system (for example the ZFS file system).

The invention operates by analysing all the instructions coming from user threads 20. This analysis is done in a transparent and simple manner (economical in computation time). The invention is interested a priori in:
 write requests 24, because it is through them that the ransomware operate, and
 user processes, because the ransomware is viruses which are of "simple" design whose purpose is to infect a large number of machines and encrypt a large number of files.

Ransomware do not carry out sophisticated attacks infecting the kernel, for bypassing the separation between user spaces made by the kernel. Indeed, these sophisticated attacks are less generic (that is to say that they do not operate on all machines) and more expensive to set up (this may require the purchase of unpatched flaws by the operating system designers, called zero-day, which increases the financial cost of such a ransomware).

Alternatively, the invention may also be interested in the write operations of the system (or originating from a kernel thread) but only when it is about requests relating to the management of virtual memory (or paging, "expanded memory").

Indeed, it is possible to indirectly modify a file by working on a copy (mapping) in virtual memory of a file or a portion thereof. In this case, it is the system which will reflect the modifications applied to the file in working memory (which is possibly virtual) on the disk. These modifications can be identified by looking at the system write operations (or from a kernel thread), but only when it is about write requests from virtual memory to disk. One can then go back to the user threads having emitted these virtual memory requests.

The invention studies only the write requests and not the other instructions, in order to be lighter. However, other requests/instructions can also be processed, for example to have other anti-ransomware software functions.

Figure 2:
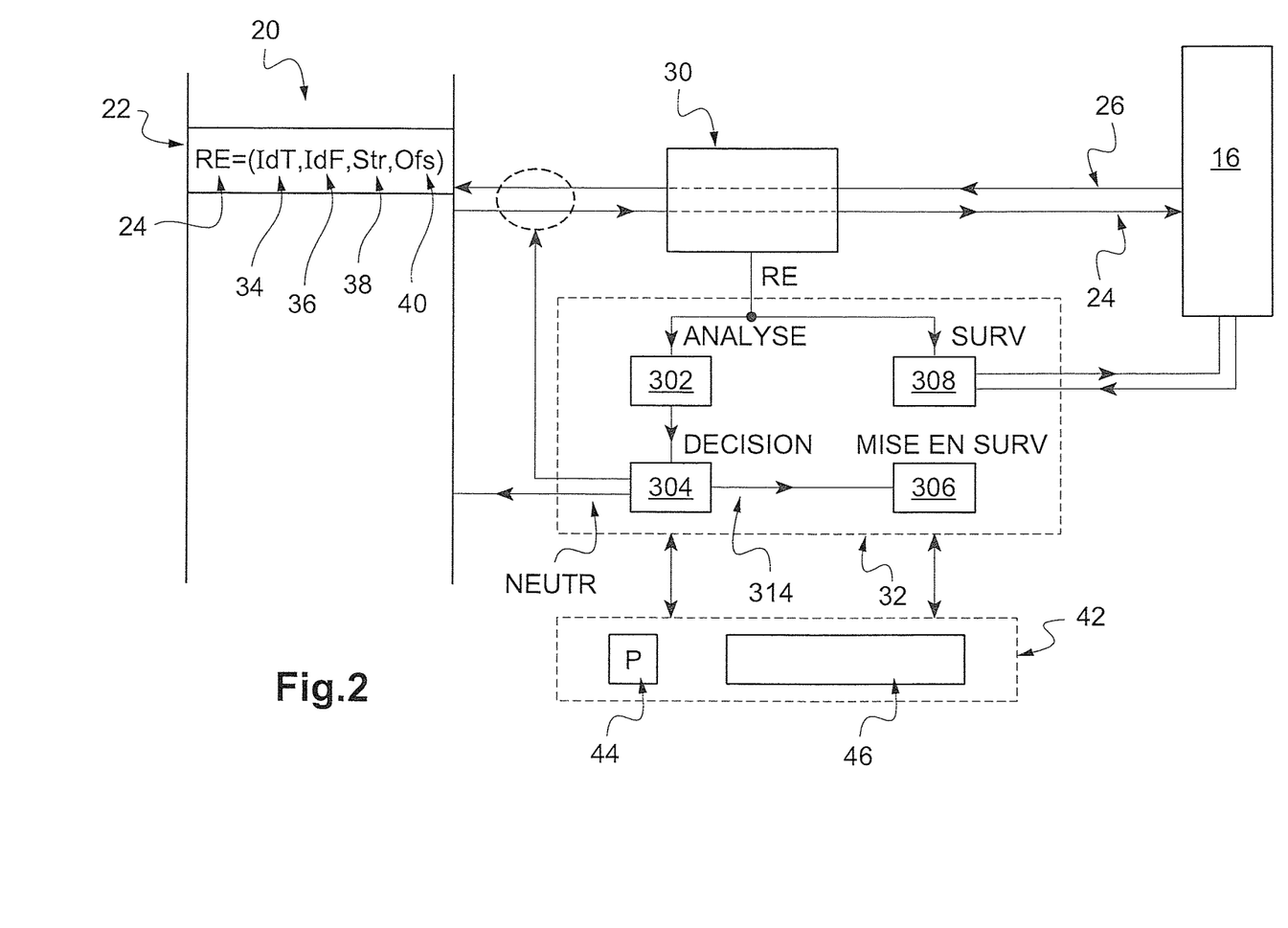
FIG. 2 shows the architecture of the sentinel program 32 of FIG. 1.

FIG. 2 shows the architecture of the sentinel program 32 of FIG. 1.

This sentinel program 32 cooperates with the HIDS probe 30. The latter is interposed between any user thread 20 and the memory manager 16. It duplicates and transmits all write requests 24 of the threads 20 to the sentinel program 32.

A file 8 write request 24 is denoted RE. It can comprise at least the following four elements:
 a thread identifier IdT (referenced 34), designating the thread 20 having emitted the request 24,
 a file identifier IdF (referenced 36), designating the file 8 concerned by the write request 24,
 a character string Str (referenced 38) to be written on the file 8, and
 a write position Ofs, from "offset", (referenced 40), designating the location in the file 8 from which the character string 36 will be written.

A process identifier IdP (or PID "process ID") can also be provided. Here, it is considered that this process identifier IdP is incorporated into the thread identifier IdT (or TID "thread ID"). In general, this identifier IdP can also be provided in RE separately from the thread identifier.

The sentinel program 32 cooperates with its working memory 42, namely the part of the system memory which is allocated thereto. This working memory 42 can store a pre-established statistical model 44, relating to the ordinary (i.e. usual, unencrypted) file header writing, and a monitoring table 46. The sentinel program 32 comprises a behavioural analysis module (sub-program) 302, a decision module (sub-program) 304, a module (sub-program) of placement under monitoring 306 and a monitoring module (sub-program) 308.

To create the pre-established statistical model 44 of usual file header writing, all the headers of a corpus of usual unencrypted files can be considered, the file header being its first bits, typically its first 2048 bits. Then, from this corpus of files, one can build a model, which will be discussed. This can be done in advance, giving the statistical model in the form of files stored in mass memory, and loaded into system memory for execution.

The Applicant has observed that, when a file header is encrypted by a write request 24, it then differs significantly from the ordinary statistical model of header writing. A deviation quantity is then calculated according to the write request 24 and the statistical model 44 of ordinary file header writing.

In other words:
 a statistical model of ordinary header writing is provided,
 the threads containing a file write request are detected, the argument of each request comprising a character string to be written,
 a first deviation quantity is calculated according to the part of the character string relating to the header of the file and of the statistical model for header writing.

Depending on this deviation quantity, the sentinel program 32 will be able to carry out various actions, such as interrupting, blocking or insulating the thread 20 which is the source of the encryption.

More generally, a first warning is issued if the first quantity exceeds a first threshold.

The advantage of this verification technique, which mainly involves file headers, is that it is light, resulting in minimal computational cost for anti-ransomware software programs based on this technique.

The monitoring table 46 is provided for identifying all the suspect threads and processes detected by the sentinel program 32, and storing their identifiers, at least temporarily. This monitoring table 46 can further be provided for, after processing an attack by a ransomware, returning to a state prior to this attack. Its structure will be discussed later.

The sentinel program 32 further comprises a behaviour analysis module (i.e. sub-program) 302, a decision module 304, a module of placement under monitoring 306 and a monitoring module 308.

The behavioural analysis module 302 retrieves the write request 24 and the statistical model 44 as input, then calculates a behavioural value 312 (denoted S). This value (or indicator) represents a deviation between the write request 24 and the statistical model 44 of header writing. RE here designates either the write request, or an identifier thereof, the content of the write request, or a pointer to this content. The behavioural analysis module 302 then sends back as an output the value S corresponding to the request RE, or else a pair request-value (RE, S) 314, which goes to the decision module 304.

The decision module 304 retrieves this request-value correspondence (RE, S) as input, and can react depending on the behavioural value S. This reaction can relate to:
 the thread 20 that contains the request, which can for example be interrupted,
 the write requests 24 of this thread, or
 the request returns 26 which are intended for this thread.

In other words, when the behavioural value exceeds one or more thresholds, the decision module can emit warnings according to the thresholds.

For example, the decision module 304 can emit a first warning if a first threshold is exceeded, and a second warning if a second threshold lower than the first one is exceeded. The first warning may relate to a proven threat, and the second one to a potential but unproven threat. What is called here "warning" corresponds to internal warnings in the machine, which are not necessarily intended to be reflected to the user.

Being able to act on the exchanges between the thread 20 and the memory manager 16 advantageously allows to inhibit one or more thread 20 requests (make them inoperative), by letting them continue to execute for the rest, and without even the thread 20 noticing it. Indeed, the ransomware could react to the detection of an interruption of a first encryption thread 20 by a counter-countermeasure, for example by changing strategy or by relaunching other encryption threads 20 on the same files.

The decision module 304 can also send the write request 24 to a module 306 of placement under monitoring.

The module 306 of placement under monitoring is arranged to receive the designation of a thread 20 considered as a suspect by the sentinel program 32. It can start or update the monitoring of this suspect thread 20. Here, the expressions "thread under monitoring" and "suspect thread" are considered synonymous.

The monitoring module 308 determines for each thread 20 (of identifier IdT) whether this thread 20 is already under monitoring. If necessary, the monitoring module 308 applies countermeasures against this thread 20 of identifier IdT.

The decision 304, placement under monitoring 306 and monitoring 308 modules can also emit write requests 24 and receive request returns 26 from the memory manager 16. For this purpose, the placement under monitoring 306 and monitoring 308 modules cooperate with the monitoring table 46. This allows, in the event of detecting a ransomware, to restore the clear version of the files which have been encrypted, without the ransomware noticing, since the sentinel program is closer to the kernel than said ransomware.

Figure 3:
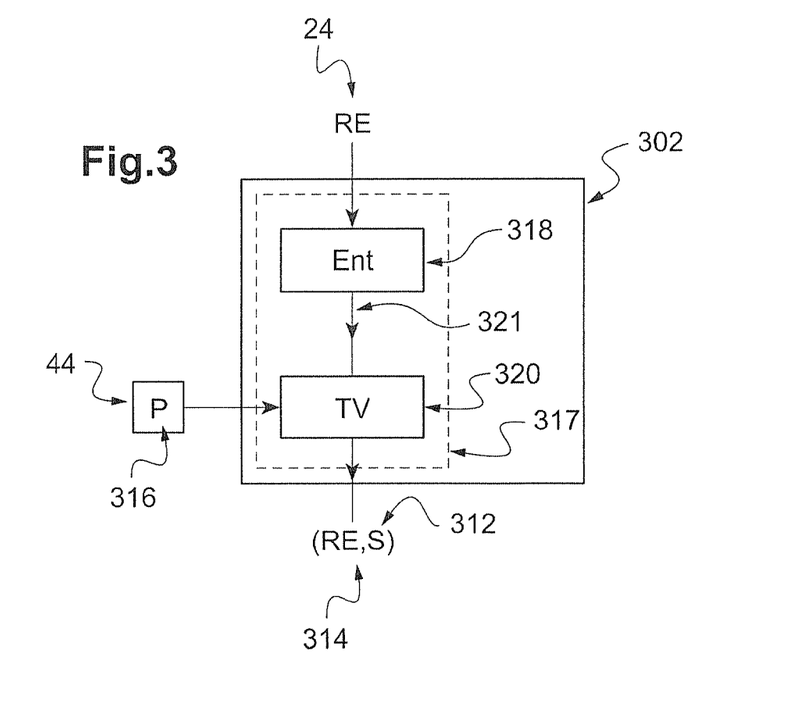
FIG. 3 shows a first embodiment of the behavioural analysis module of FIG. 2.

FIG. 3 shows a first embodiment of the behavioural analysis module 302 of FIG. 2.

In this implementation of the invention, the behavioural analysis module 302 preferentially studies the behaviour of write requests on the headers of the files. These headers have the particularity of containing, among others, patterns, specific to common file formats, recognised by their extensions: extensions (".doc", ".docx", ".docm") for Microsoft Wordm documents, extension ".txt" for text documents, extension ".pdf" for Acrobats™ documents), multimedia files (".avi", ".mp4", ".mkv" for video files, ".flac", ".mp3", ".wav" for audio files), etc. This list of types, formats and extensions is not exhaustive, and any file extension includes its own characteristic patterns that the statistical model can cover.

Alternatively, the statistical model can include statistical sub-models in order to more finely process formats, extensions and/or locations of particular files. Thus, the sentinel program can gain in precision in the presence of requests relating to directories or areas of memory dedicated specifically to a type or a family of file types (for example archive memory).

The behavioural analysis module 302 receives as input the write request RE and a statistical model 44 comprising a probability law 316 denoted P, as will be seen.

The behavioural analysis module 302 performs a series of operations on header 317. This series of operations comprises:
 an extraction operation 318 on the write request, and
 a likelihood calculation operation 320.

The purpose of the extraction operation 318 is to position the effect of the write request in the header Ent00 of the concerned file IdF. The request comprises a string Str, and a position information Ofs. If Ofs=0, the string Str will constitute the new header Ent01 of the file, or at least its beginning. If Ofs is greater than the size L_Ent of the file header, this header remains unchanged. If Ofs is comprised between 0 and L_Ent, the new header can be taken: Ent01=Left(Ent00, Ofs)+Left(Str, L_Ent−Ofs), where Left (x, n) is the function that gives the first n characters of a string x (that is to say, which keeps the left part of the string, or truncation to the left), and "+" is the concatenation function of character strings.

The part of the new header that emanates from the write request is noted Ent_RE, with Ent_RE=Left (Str, L_Ent−Ofs)

The behavioural analysis module 302 can work on a quantity Ent99, which can be the new header Ent01 of the file, or the part Ent_RE of this new header which emanates from the write request.

It is currently estimated that the size of the string must be at least 1024 bits for the results to be significant. So at least 1024 bits are derived from the first 2048 bits of a file.

A log likelihood calculation 320 (or log likelihood test, "log likelihood ratio") of the set of events Ent99 is then carried out according to the probability law 316 compared to a probability law of a model of random ransomware, denoted Q. This results in a likelihood 320, which is transformed into the aforementioned value S, also called behavioural value 312. It is associated with the write request RE in a pair request-value (RE, S) that the behavioural analysis module 302 returns as output.

The probability law P used can be defined as follows:
 a predetermined corpus of files is considered;
 the headers of all the files are extracted;
 the distribution DIS_17 of the sequences of 17 bits in these headers, compared to the $2^{17}$ sequences of 17 different bits which are possible, is calculated
 after possible renormalisation, the distribution DIS_17 provides the probability law P.

The probability law of a random ransomware Q model is an equally probable probability law, that is to say that each transition is equally probable, or that the underlying 17-bit string distribution law is uniform.

The person skilled in the art will understand that this distribution is equivalent to a Markov chain of order 16, which expresses the probability of the value of a bit, knowing the previous 16. Here, the expression "Markov chain" indifferently designates the Markov chain itself, and/or its induced distribution. A Markov chain can be represented in the form of its probabilistic automaton or its stochastic matrix.

Alternatively, one can generalise to other Markov chains, of order k≠16, which express the probability of the value of a bit, by knowing the previous k.

The likelihood and the log likelihood test will now be discussed.

Likelihood is a concept known in the state of the art of probability, which will now be briefly described. The function $L_p$ is called likelihood associated with the probability law P, which has an n-tuple of events $(x_1, \ldots, x_n)$ of P associates the amount:

$$L_P(x_1 \ldots x_n) = \prod_{i=1}^{n} P(x_i) \qquad [\text{I}]$$

This concept is interpreted as follows: if it is assumed that the n-tuple $(x_1, \ldots, x_n)$ is a particular succession of independent events (in the sense of probabilities), then $L_p$ constitutes the likelihood of the fact that this particular succession of events occurs among all the possible event successions.

The calculation of the ratio of the likelihood associated with the probability law Q of the n-tuple of events $(x_1, \ldots, x_n)$ on the likelihood associated with the probability law P of the n-tuple of events $(x_1, \ldots, x_n)$ is called the likelihood test of the n-tuple of events $(x_1, \ldots, x_n)$ according to the probability law Q compared to the probability law P. That is to say the calculation of the rate t:

$$t = \frac{L_Q(x_1 \ldots x_n)}{L_P(x_1 \ldots x_n)} \qquad [\text{II}]$$

The likelihood test is interpreted as follows: the likelihood that the n-tuple of events $(x_1, \ldots, x_n)$ will occur "in absolute terms" according to one of the two laws Q or P is not calculated, but to how much more likely it is that the n-tuple of events $(x_1, \ldots, x_n)$ occurs while being governed by the law Q rather than the law P. If t is greater than 1, then it is more likely that it is the law Q rather than the law P which governs the succession of events $(x_1, \ldots, x_n)$, and it is particularly true since t is large.

A log likelihood test of the n-tuple of events $(x_1, \ldots, x_n)$ according to the probability law Q compared to the probability law P then comprises the calculation of the logarithm of the result of the likelihood test of n-tuple of events $(x_1, \ldots, x_n)$ according to the probability law Q compared to the probability law P. In other words, the calculation of the following amount s, called log likelihood rate:

$$s = \log\left(\frac{L_Q(x_1 \ldots x_n)}{L_P(x_1 \ldots x_n)}\right) \qquad [\text{III}]$$

The determination of the amount s then becomes calculated by the following formula:

$$s = \left[\sum_{i=1}^{n} [\log(Q(x_i)) - \log(P(x_i))]\right] \qquad [\text{IV}]$$

The log likelihood test is advantageous for two major reasons:
 the likelihoods being small numbers, one limits the accuracy problems ("underflow"), and
 the likelihood calculation which is a product of amounts (probabilities of events) is replaced by a sum of amounts. Indeed, it is recalled that in computer science, additions are much more efficient in terms of time/calculation power than multiplications, which therefore allows the sentinel program 32 to gain even more lightness.

In the context of the invention, the probability law used can be a distribution of sequences of 17 bits (for example that in the aforementioned corpus). The succession of events can comprise the succession of draws for each bit of Ent99 of a binary value by knowing the preceding 16 bits, or indifferently the measured distribution of the sequences of 17 bits in Ent99.

For the rest, sequence of n bits and number of n digits in base 2 will be designated interchangeably.

For the purposes of the invention, it suffices to memorise the probability law itself, as well as the formula [IV] of the logarithmic rate of likelihood, above.

The memorisation of the probability law can be done in the form of a list $K=(K_0, K_1, \ldots, K_i, \ldots, K_N)$ of transition probabilities.

A sequence i of 16 bits is considered. The "transition" consists in adding (concatenating) a bit j thereto (equal to 0 or 1). $P_i(j)$ is denoted the probability of having the bit j added to the succession of the sequence i. This probability is called a "conditional probability", that is to say a probability of having the event j under the condition i. It is known that a probability is a number comprised between 0 and 1.

Each line of the list K can be written:

$$K_{2i+j} = P_i(j) \qquad [\text{V}]$$

where:
2.i+j is the sequence of 16 bits i, to which the bit j has been concatenated. Indeed, multiplying by two a number in base 2 amounts to adding a 0 at the end of the number (in the same way as multiplying a number by ten in base ten also amounts to adding a 0 at the end of the number). If the last bit of a number in base 2 is 0, adding j to this number is equivalent to replacing this 0 by j.

In addition, the list K then verifies:

$$K_{2i+0} + K_{2i+1} = P_i(0) + P_i(1) = 1 \qquad [\text{VI}]$$

This equality is interpreted as follows: if there is the sequence of 16 bits i, there are only two possibilities for the value of the following bit: 0 or 1. Also the sum of the probabilities of these two events ("j=0" and "j=1") knowing i must be equal to 1.

This particular form is not compulsory, and other structures can be used to memorise the probability law P in a form adapted for the calculations necessary for the behavioural analysis module 302. For example, in another implementation, the probability law P can be stored in the form of a 17-bit string distribution law.

Figure 4:
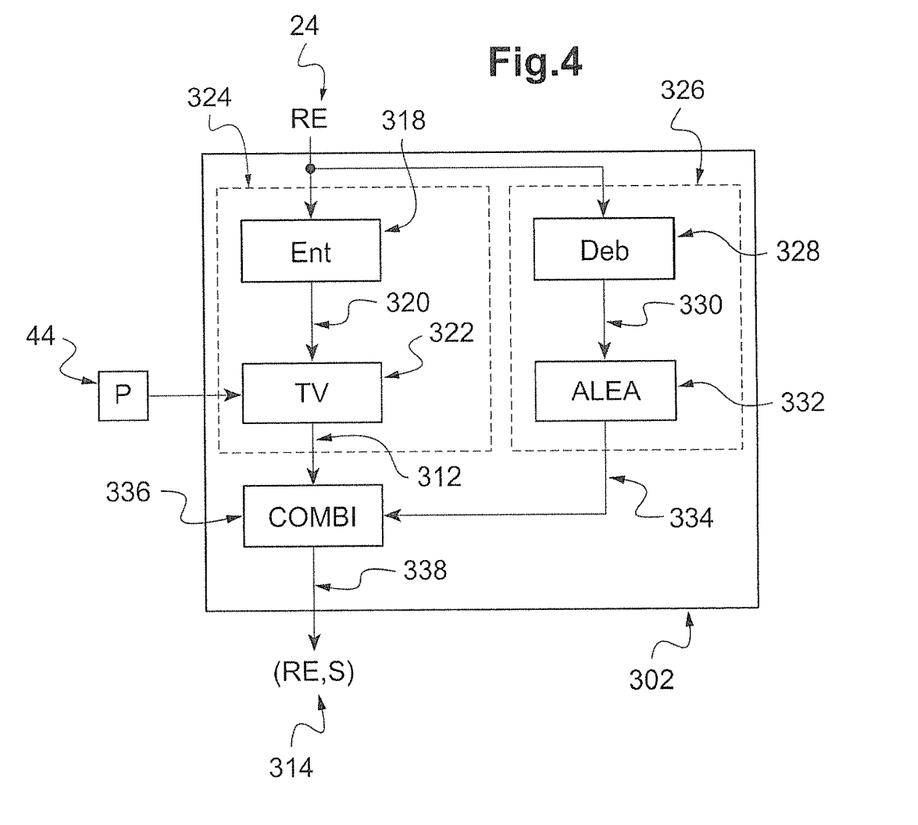
FIG. 4 shows a second embodiment of the behavioural analysis module of FIG. 2.

FIG. 4 shows a second implementation of the behavioural analysis module 302 of FIG. 2.

The behavioural analysis module 302 receives as input the write request RE and a statistical model 44 comprising a probability law 316 denoted P.

The behavioural analysis module 302 performs in a first branch 324 the series of operation on header 317 described above, with reference to FIG. 3. The result of this series is a first behavioural value $C_1$.

Besides this first branch 324, the behavioural analysis module 302 can comprise a second branch 326 where it performs, in parallel, another series of operations. The first operation can be a truncation 328, which only keeps the beginning 330, noted Deb_Str, of the character string Str. This beginning Deb_Str can typically be the first 16 kb (kilobytes) of the character string Str. The second operation can be a calculation of the randomness 332 by taking as argument Deb_Str and by sending back a second behavioural value called random value 334 and noted $C_2$. "Calculation of the randomness", means here the calculation of a quantity of quantification of the randomness of Deb_Str.

At the output of these two branches 324 and 326, the behavioural analysis module 302 performs an operation of combining 336 the two values $C_1$ and $C_2$ to calculate a third value 338, denoted S. This value S can be seen as a summary of the behaviour of the string Str compared to the two indicators which are the result of the likelihood test 320 and the result of the randomness calculation 332.

This third value S is associated with the write request RE in a pair request-value (RE, S) that the behavioural analysis module 302 returns as an output.

The calculation operation of the randomness 332 includes a calculation of $\chi^2$ (chi-square), which will be discussed.

The combination 336 of the two values 312 and 334 can be one of the following operations:
- a function of two variables, taking as input the two values 312 and 334 and sending back a single quantity synthesising the two indicators,
- pairing these two values in a pair ($C_1$, $C_2$) in order to preserve as much information as possible,
- or any other usual computer operation to combine two computer variables.

This variant of the behavioural analysis module 302 therefore combines the detection of randomness, in the string Str itself, with the verification of the headers modified by the write request, on the basis of a statistical model, this verification being that described above, in connection with the implementation according to FIG. 3.

As a reminder, an encryption process performs a writing of bits whose distribution is random, in order to avoid being broken by statistical methods. It is known that the detection of such encryptions can be based on a random measurement, for example by the method called $\chi^2$ (chi-square) method, as described by the Applicant in the article:

"Data Aware Defense (DaD): Towards a Generic and Practical Ransomware Countermeasure", A. Palisse, A. Durand, H. Le Bouder, C. Le Guernic and J.-L. Lanet, NordSec, Nordic Conference on Secure IT Systems, 8-10 Nov. 2017, Tartu, Estonia.

The only use of $\chi^2$ or another random calculation technique generates a high rate of false positives for the detection of ransomware, that is to say of threads wrongly identified as ransomware. The combination of the $\chi^2$ method with that of the header model advantageously allows to significantly reduce this rate of false positives.

The $\chi^2$ method can comprise calculating the difference between the measured distribution Deb_Str (the 16 kb truncation) and an equally probable theoretical distribution of the n-bit sequences, which is called "distribution under null hypothesis". Typically, n can be 8 bits. Then, the calculated difference is used as a basis for calculating a variance, usually denoted $\chi^2$ (hence the name of the method). This variance can then be renormalised in order to obtain a final quantification, for example a probability (comprised in 0 and 1) that Deb_str is a random bit string.

Truncation can be limited to 16 kb to prevent a ransomware from slowing down or blocking the sentinel program, for example with a "zip bomb". Such an attack starts from a compressed file of small size, which, after decompression occupies an enormous space, likely to saturate the target computer system. With a truncation limited to ten kilobytes, typically 16 kb, the worst calculating time of $\chi^2$ on a write request admits an upper bound regardless of the situation.

When the character string is less than 16 kb in size, but greater than a minimum threshold, for example 2 kb, the same test for $\chi^2$ is performed. On the other hand, if the character string Str is less than this minimum threshold, it is ignored for decision-making as to the nature of the thread. The sentinel program 32 can nevertheless keep a record of the write request for a possible subsequent restoration, as will be seen below.

Alternatively, this minimum threshold may be different, or may not exist.

Alternatively, the truncation operation 328 can be carried out by the HIDS probe, as soon as the content of the write requests is duplicated, and not by the behavioural analysis module 302. This advantageously allows to lighten the transmission of information between the different modules.

The use of $\chi^2$ in the context of ransomware countermeasures is currently preferred to the use of Shannon's entropy, because the latter distinguishes encryption and compression poorly, unlike that of $\chi^2$. Particularly, the Shannon's entropy is sensitive to JPEG compression, which compression generates a high level of entropy. Shannon's entropy can nevertheless be used in some cases.

The operation for calculating $\chi^2$ (or variance) 332 can alternatively be an operation for determining the belonging 339 of the variance to a random write variance interval I. This belonging operation 339 comprises determining whether the variance calculated in operation 332 is a typical variance of a random write. For a uniform distribution of the strings of 8 bits (256 degrees of freedom) the typical median of a random write is comprised within the random write variance interval I=[212,66,301,12], This random write variance interval I is given with a 5% risk of error, that is to say a random write has a 5% chance of having a variance which is not comprised within this random write variance interval I. If a write request has a variance in this random write variance interval I, then the sentinel program 32 can consider it as suspect within the meaning of this indicator of $\chi^2$. The belonging operation 339 thus described can return the binary value 1 if the variance is comprised within the random write variance interval and the binary value 0 otherwise. These two binary values can alternatively be replaced by integers or floating-point numbers, according to the typing needs of the invention.

Alternatively, the belonging operation 339 may comprise calculating the median of a plurality of variances over a sliding time window (FTG). The belonging operation 339 then comprises the following sub-operations:
- for each write request 24 emitted by a user thread 20 at instant t, and duplicated and transmitted by the HIDS probe 30, retrieving all the write requests emitted by this user thread 20 between time t-FTG and time t, calculating for each request thus retrieved the variance of the distribution of the 8-bit strings in the first 16 kb of the string Str, as described above, calculating a median of these calculated variances, and determining if this median is comprised within the random write variance interval I.

In this variant, the sliding time window FTG can typically be worth one second (1 s).

This variant thus described advantageously allows to give a simple binary response as an indicator, but also greatly limiting false positives, for at least two reasons:

a ransomware will encrypt a large number of files very quickly, while a compression program (for example converting non-compressed audio files .wav into compressed audio files .mp3) will typically encrypt one every few seconds, and the calculation of a median of variances of a large number of requests makes encryption detection more stable: instead of observing a potential encryption with 5% of chance of not detecting it, a large number of potential encryptions will be observed with a much higher probability of detecting them, since the "pathological" cases (that is to say the 5% of random draws of variance not comprised in I) will be "drowned" in the "standard" cases (that is to say the 95% of random draws of variance comprised within the interval I).

The use of the median rather than the average advantageously allows to further drastically reduce the influence of these 5% of cases out of interval.

Alternatively, the random calculation operation can use Markov chains, an entropy calculation, for example Shannon entropy, Kolmogorov-Sinai metric entropy, Adler-Konheim-McAndrew topological entropy, conditional entropy, Rényi entropy, or any other quantification of known randomness.

According to other variants, the behavioural analysis module 302 can include other additional branches to more finely estimate the behavioural value. These additional branches can be used to specifically detect some patterns of ransomware attack or analyse write requests specifically on some file formats or extensions as described above. Multiple statistical sub-models can be implemented as described above.

The method described above with respect to FIG. 4 also allows to detect the dangerousness of write requests which do not modify the header. Indeed, the header of a file comprises the date of the last modification, and therefore any regular write request must update this date of last modification. A request that does not touch the header and whose string Str has a large amount of randomness can therefore be highly suspect for the behavioural analysis module 302.

Figure 5:
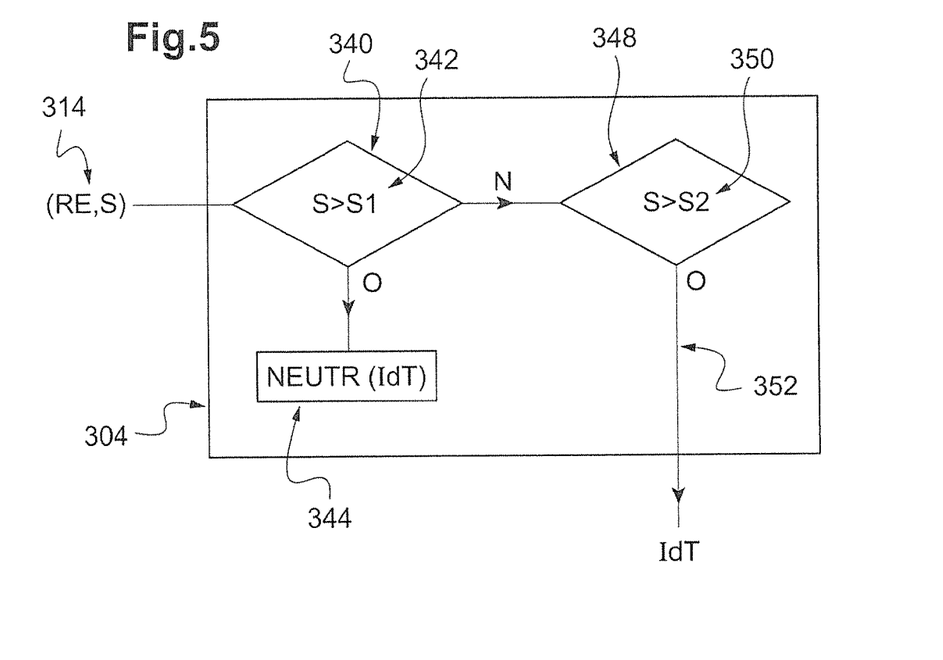
FIG. 5 shows a diagram of the decision module of FIG. 2.

FIG. 5 shows a diagram of the decision module 304 of FIG. 2.

The decision module 304 retrieves as input the pair request-value (RE, S). The decision module 304 performs a first test operation 340 to determine whether the behavioural value S is greater than a first threshold 342, or warning threshold. This warning threshold is denoted S1. If this is the case, the decision module 304 can perform a neutralisation operation 334 on the thread of identifier IdT. This neutralisation operation is denoted NEUTR (IdT).

This neutralisation operation 344 can consist in making the concerned thread 20 disappear ("kill"), or even in killing the whole process 18 which includes it. Alternatively, the thread can be blocked rather than interrupted, that is to say, left to run while refusing to execute the instructions 22 that it emits.

But the ransomware can then detect it. Alternatively, the neutralisation operation 344 can therefore comprise insulating the concerned thread 20 without the ransomware noticing and recording the identifier IdT (or the process identifier) of the thread in a table 346 of inoperative threads. To render a thread 20 inoperative, the neutralisation operation 344 comprises intercepting all its next write requests 24 and emitting "false" positive request returns 26 in response, so that the thread 20 continues to operate without having the impression of being detected or blocked.

Making a ransomware inoperative without killing it allows to observe its functions, without performing them (or by performing them in a "sandbox"), therefore studying it without it being able to cause damage. Studying such ransomware can be useful in developing countermeasures specific to some ransomware. These countermeasures can be elaborated on the basis of automated deep learning.

In the case where the behavioural value S is not greater than the warning threshold S1, the decision module 304 performs a second test operation 348 to determine whether the behavioural value S is greater than a second threshold 350, or monitoring threshold. This monitoring threshold is denoted S2. If this is the case, the decision module 304 sends the thread identifier IdT to the module 306 of placement under monitoring.

The monitoring level is called threat level 1 and the warning level is called threat level 2, with reference to the prioritisation of the threat. The level called "current" level, that is to say of a process acting in an ordinary manner, is called level 0. Alternatively, the invention may comprise other threat levels.

Alternatively, when the behavioural value S is the product of a combination between several indicators, as described above with regard to FIG. 4, it is possible to provide multiple pairs of thresholds ($S_{1i}$, $S_{2i}$), one for each indicator used. In the implementation of FIG. 4, four thresholds are thus provided:

a first threshold $S_{11}$ for the header write indicator first threshold $S_{12}$ for the indicator $\chi^2$ a second threshold $S_{21}$ for the header write indicator a second threshold $S_{22}$ for the indicator $\chi^2$ The test operations 340 and 348 can then comprise determining whether one of the thresholds is exceeded. Exceeding one of the first thresholds 342 (regardless of the indicator) then leads to the neutralisation (344) of the thread 20, and exceeding one of the second thresholds 350 (but not one of the first ones) then leads the placement of the thread 20 under monitoring (306).

In a variant, the behavioural analysis 302 and decision 304 modules can be subdivided into as many branches as there are indicators (behavioural value on header or calculation of $\chi^2$), the branches being independent and parallel to each other. Thus, each branch can be able to manage the processing of an indicator and the reaction adapted for each indicator. Particularly, this advantageously allows each branch to be able to detect and apply alone (without the use of any other indicator) ransomware countermeasures.

Figure 6:
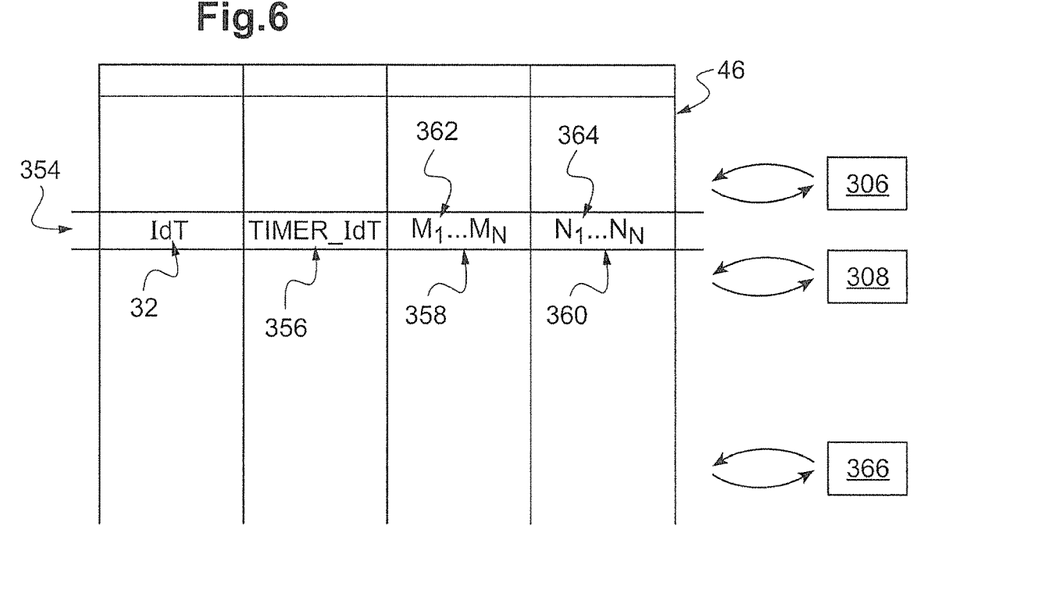
FIG. 6 shows the monitoring table 46 of FIG. 2.

FIG. 6 shows an example of the monitoring table 46 of FIG. 2.

This table comprises a plurality of monitoring lines 354. Each monitoring line 354 comprises the thread identifier IdT, a timer 356 a list of modifications 358 and a backup list 360. These elements can perform the following functions:

The thread identifier IdT of the monitoring line 354 identifies the thread 20 to be monitored.

The timer 356 of the monitoring line 354 represents the time since the last suspect action of the thread of identifier IdT. This timer is denoted TIMER IdT. It can also be called time since the last suspect request.

The list of modifications 358 of the monitoring line 354 is denoted (M_1, . . . , M_n). This list of modifications 358 comprises the position of each modification 362 (denoted M) on a file by the thread of identifier IdT from the moment the thread of identifier IdT is under monitoring. Each modification is calculated from the file identifier IdF, from the write position Ofs and from the character string Str of the write request 24.

The backup list 360 of the monitoring line 354 is denoted (S_1, . . . , S_n). This backup list 360 comprises the location of backups (or duplicates) of the portions of files duplicated by the monitoring module 308 before any write request of the suspect thread of identifier IdT.

The monitoring table 46 can make a correspondence between the list of modifications 358 and the backup list 360.

Alternatively, the monitoring table 46 can use file software version (or "versioning") management methods, for example methods originating from the program "git", in order to keep up to date a list of modifications of files affected by a suspect thread.

This monitoring table 46 is thus provided for:
listing all the threads 20 to be monitored,
indicating for how long the thread has been monitored, which allows in particular to stop monitoring a thread when it has not emitted a suspect request for a certain duration, called monitoring duration 364,
keeping a record of all the modifications of each thread 20 of identifier IdT placed under monitoring in order to be able to cancel almost all of its write requests if it turns out that the thread 20 was a ransomware.

This monitoring table also comprises an updating member 366 which will carry out updating passes of the monitoring table 46, by browsing the monitoring table to delete or archive the monitoring lines 354 when their respective timer 356 exceeds the monitoring duration 364.

The monitoring duration 364 can typically be 5 to 10 minutes. The passes of the updating member can typically be every minute or every 30 seconds.

This monitoring table 46 advantageously allows to limit the amount of threads 20 to be monitored. Indeed, if a thread 20 warns the sentinel program 32 by activating the threshold S2 but not the threshold S1, then this thread 20 is not necessarily a clear threat but a potential threat. In which case it is placed under monitoring.

If in the future the thread 20 does not prove to be again a suspect during the monitoring period 364, then it is plausible that the thread 20 was a false positive of the behavioural analysis module 302 and the decision module 304. In this case, the thread 20 is no longer monitored, and the files which it targets with write requests are no longer systematically duplicated, which allows to contain the calculation cost of the sentinel program 32.

Thus, only the threads 20 regularly emitting suspect write requests remain in the monitoring table 46.

Alternatively, the timer 356 can be replaced by a timestamping of the last suspect request. In this case, during each update pass of the updating member 366, the latter will, for each timestamp, verify whether it is not earlier than the current date minus the monitoring duration 364.

The example of the monitoring table 46 which has just been described is simple, to avoid adding to the description. A different, more complete structure can be used for the table, for example to allow to timestamp each instruction of a thread 20 under monitoring.

Figure 7:
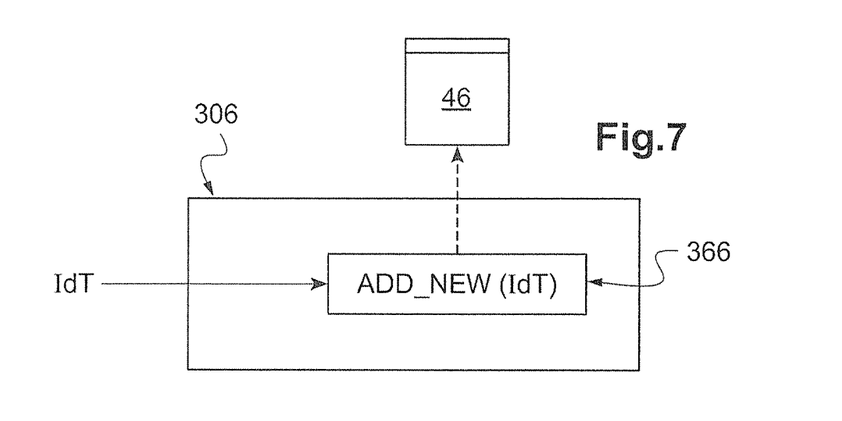
FIG. 7 shows the module of placement under monitoring of FIG. 2.

FIG. 7 shows the module 306 of placement under monitoring of FIG. 2.

The module 306 of placement under monitoring receives as input a thread identifier IdT. The module 306 of placement under monitoring will first search (366) whether the thread 20 of identifier IDT is already present in the monitoring table 46.

Where appropriate, this thread 20 of identifier IdT is already under monitoring. As this thread has just emitted a new suspect write request 24, the module 306 of placement under monitoring resets (368) its timer (or time since the last suspect request) to 0.

When the thread 20 of identifier IdT is not in the monitoring table 46, this means that this thread 20 is either newly suspect or has not emitted a suspect request for a long time (more than the monitoring duration 364). The module 306 of placement under monitoring then inserts (370) a new monitoring line 354 into the monitoring table 46. This new monitoring line 354 comprises: the thread identifier IdT, a timer TIMER IdT initialised to 0, a modification list 358 initially empty, and a backup list 360 initially empty.

Alternatively, when a thread 20 of a process 18 of identifier IdP is placed under monitoring by the module 306 of placement under monitoring, all or part of the threads 20 of the process IdP can be placed under monitoring.

Figure 8:
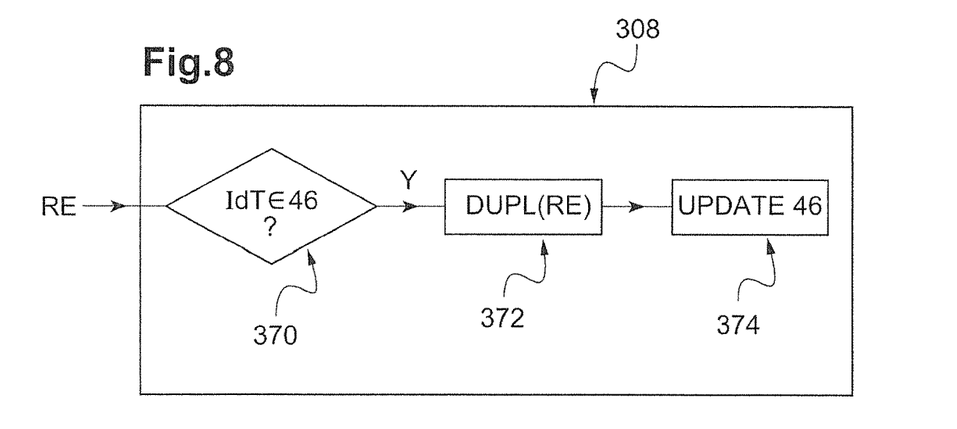
FIG. 8 shows the monitoring module of FIG. 2.

FIG. 8 shows the monitoring module 308 of FIG. 2.

It receives as input the write request RE and begins by searching (366) for the identifier IdT of the thread in the monitoring table 46.

If the identifier IdT of the thread is entered in the monitoring table, then this thread 20 is already suspect because of a previous request.

In this case of a new request on an already suspect thread 20, the monitoring module 308 can then protect the computer system by "backing up" the files concerned by a request of said already suspect thread 20 before their modification.

To this end, the monitoring module 308 duplicates (372) the portion of the file of identifier IdF which is affected by the current write request 24 of the thread 20. This portion of the file IdF being in the process of being replaced by the string Str, duplication (372) has priority over write 24 of the string Str. This is possible because the monitoring module 308 is in the kernel 12 unlike the thread 20 which is in the user space 14.

Thus, regardless of the write operation carried out by an already suspected thread 20, it can be reversed if this thread 20 is subsequently considered to be a ransomware, or any other threat. To reverse the writing of a thread 20, writing can be carried out on the modified locations of the file IdF of the duplicate portions, the locations of which are kept in the monitoring table 46. Thus, the file modified by the ransomware can return to a state prior to the action of said ransomware, in the event of a proven attack.

The monitoring program 308 will then store the duplicate file portions and their locations in a backup file in the mass memory. This backup file is invisible to processes 18 and user threads 20.

Once the duplication is carried out, the monitoring module 308 performs an update 374 of the monitoring table 46 to add the new duplication performed therein.

The monitoring module 308 operates in parallel with the string 302-304-306 which determines which threads are to be monitored. Thus, this separation advantageously allows to duplicate only the threads already considered to be suspect, without the need to reanalyse them before duplication. This solution is more economical in calculation time. In return, this solution implies that the first file modified by a write request of a thread subsequently considered as suspect is lost. This is an acceptable compromise in so far as the strength of ransomware is based on the large amount of encrypted files on a computer.

Alternatively, the sentinel program 32 can place a user thread 20 under monitoring (348) after three suspect write requests 24, and no longer a single request. The emission of three suspect write requests 24, necessary to be placed under monitoring, may not be time-bound. In other words, the sentinel program 32 takes into account the entire history of a user thread 20. This variant advantageously allows to detect ransomware slowly encrypting files.

Alternatively, the sentinel program can cooperate with a table of neutralised threads, and with a neutralisation module which neutralises each request emitted by the neutralised thread. This table can also comprise the preferential processing applied to each thread, in order to neutralise some threads differently from others, for example by insulating some and by interrupting others. Thus, it is possible to save a little more calculation power, by not analysing the already neutralised threads.

Figure 9:
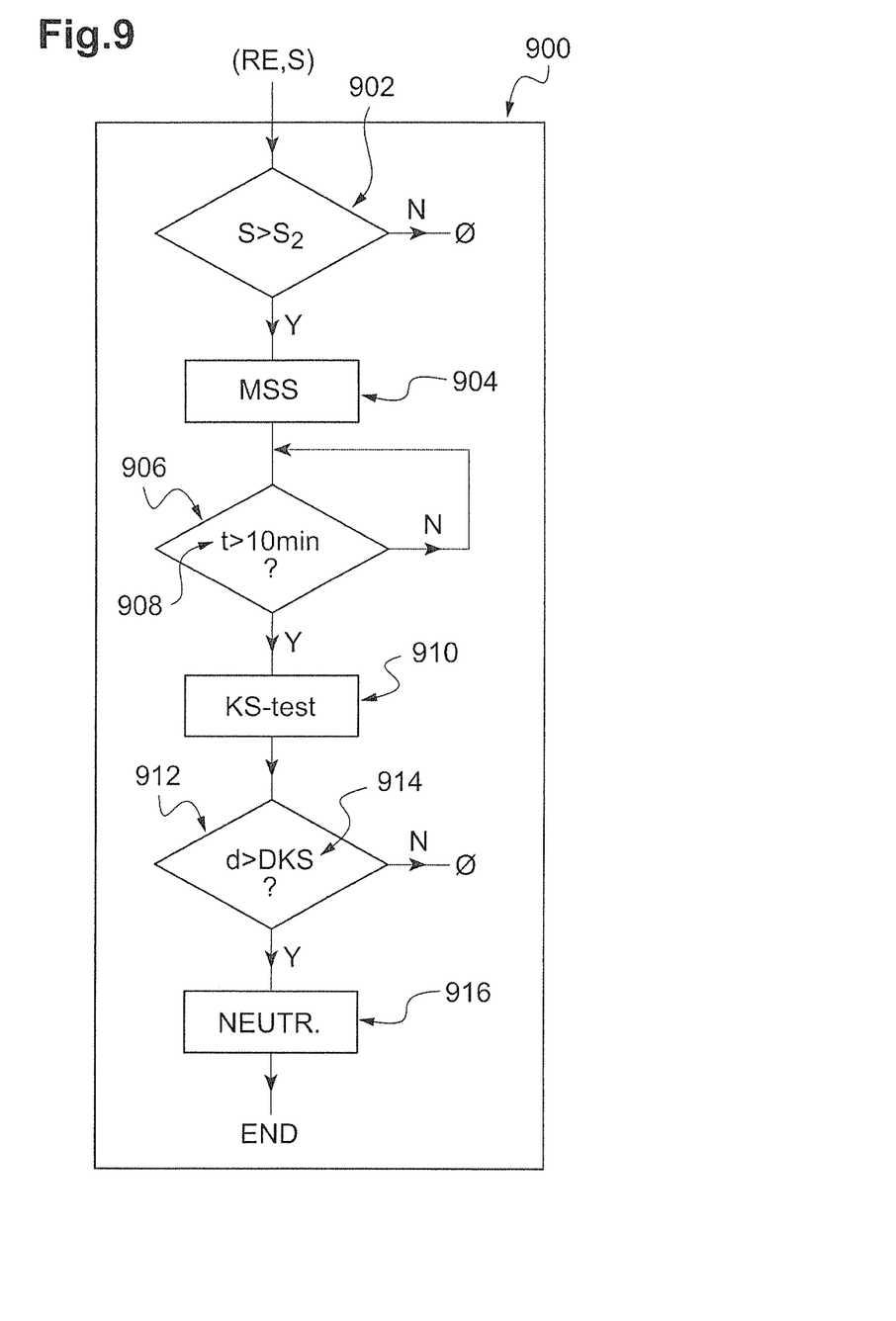
FIG. 9 shows a variant of the decision module of FIG. 2.

FIG. 9 shows a variant of the decision module 304 of FIG. 2.

This variant is called sequential decision module 900. The sequential decision module 900 receives as input the pair request-value 314 and verifies (902) whether the behavioural value S is greater than a monitoring threshold S2. If necessary, the sequential decision module 900 places the user thread 20 of identifier IdT under active monitoring (904), via the module 306 of placement under monitoring.

The sequential decision module 900 can therefore perform an active monitoring operation 906 of the suspected thread 20 during a collection duration 908, typically for ten minutes. Then at the end of this collection duration 908, the sequential decision module 900 can perform one or a plurality of statistical analyses in order to determine whether the thread 20 being monitored is a ransomware or not.

It is noted that TMS is the instant when the user thread 20 is placed under active monitoring. It is noted that DDC is the collection duration 908. DDC can typically be worth 10 minutes.

The sequential decision module 900 can collect all the write requests 24 of the thread 20 during the collection duration 908, as well as all the write requests 24 of the processes 18 and threads 20 of the entire system. The set of write requests 24 processes 18 and threads 20 of the entire system thus collected is called "safe set". The set of write requests 24 of the thread 20 thus collected is called "suspect set". The write requests 24 comprised in the suspect set are collected from the write requests 24 emitted by the thread between the instant TMS and the instant TMS+DDC.

In a first variant, the write requests 24 included in the safe set are collected retroactively from the write requests 24 emitted by the entire system between the instant TMS-DDC and the instant TMS. In order to facilitate this collection and limit redundancies, the sentinel program can comprise a history table arranged to contain a history of write requests emitted during the DDS last minutes.

In a second variant, the write requests 24 comprised in the safe set are also collected from the write requests 24 emitted by the entire system between the instant TMS and the instant TMS+DDC.

For each request, whether it comes from the monitored thread 20 or from the entire system, the sequential decision module 900 performs in operation 910 the following steps:

calculating an indicator J (for example the likelihood test or the calculation of variance) as described above, determining a first cumulative distribution curve (or "CDF") according to the indicator J for the suspect set, and determining a second cumulative distribution curve for the safe set.

The first cumulative distribution curve is called "suspect trace" and denoted D1, and the second one is called "safe trace" and denoted D2.

In order to determine whether the thread 20 thus placed under monitoring is a proven threat, in particular a ransomware, the sequential decision module 900 can carry out a Kolmogorov-Smirnov test (or "KS-test"). This test comprises the calculation of a statistical distance d between the safe trace and the suspect trace. This distance d can be calculated according to the formula below:

$$d = \sup_{x} |D1(x) - D2(x)|$$

Where x is an integer ranging from 0 to $2^n-1$, where n is the number of bits considered for the distribution of strings of n bits previously calculated. This distance d is interpreted as follows: it is the distance (in an abstract sense) between the two safe and suspect traces. If it is zero, it means that the two traces are governed by the same statistical or probabilistic law. If this distance is large, then it is likely that these two safe and suspect sets are governed by different underlying laws. For example, if the suspect set is governed by a uniform probability law (for example: a ransomware in the process of rapidly encrypting) and the safe set by usual (or ordinary) writing on file.

The advantage of the KS-test is that it is not a parametric test, that is to say, it does not depend on an assumption about the distribution of the data. In addition, variations in the size of the samples observed is not an obstacle in the most general version of the KS-test.

The typical DKS distances used for operation 912 are 0.44 for the header write indicator with log likelihood test and 0.26 for the variance calculation.

The invention may alternatively comprise other additional branches provided with other indicators.

Alternatively, this placement 904 of the thread 20 under monitoring is done only after three write requests 24 whose behavioural value 312 exceeds the threshold $S_2$. This solution advantageously allows to lighten the execution of the sentinel program 32, since the placement under monitoring 304 with collection is a step heavy in calculation, although very effective.

Alternatively, the collection carried out during the active monitoring operation 906 can comprise collecting only the last write requests 24 (in NWR number) for the entire system and/or for the monitored user thread 20. NWR is an integer, typically of the order of 10,000, which can be adjusted in order to control the impact of the sentinel program 32 on the performance of the computer 1, particularly on the random-access memory 9. If the history table described above is implemented, it can then comprise a module to clean from the history table the write requests which are no longer taken into account.

The invention claimed is:

1. An encryption detection device, comprising:
a computer with a central processing unit and a memory, which comprises a random access memory and a mass memory comprising files, the central processing unit cooperating with the random access memory, and with an operating system which has a kernel and is configured to be executed by the central processing unit processes, cut into threads, which comprise functions for accessing files, characterised in that a statistical model of ordinary file header writing is stored in the memory, and in that the encryption detection device comprises a sentinel program active at the kernel and arranged to:

retrieve the write requests in a file, emitted by each thread, such requests comprising a character string to be written as argument, calculate a first deviation quantity according to the part of the character string relating to the header of the file and according to the statistical model of ordinary file header writing, then issue a first warning if the first deviation quantity exceeds a first threshold.

2. The encryption detection device according to claim 1, characterised in that the sentinel program also issues a second warning if the first deviation quantity is greater than a second threshold, less than the first threshold.

3. The encryption detection device according to claim 2, characterised in that the sentinel program is arranged to:
a) define a critical quantity derived from the first deviation quantity,
b) neutralise the thread when the critical quantity exceeds the first threshold,
c) place the thread under monitoring when the critical quantity exceeds the second threshold but not the first threshold, and
for a thread which is already under monitoring,
d) at least partially duplicate files targeted by a write request of such a thread, and
e) stop monitoring the thread if, at the end of a predefined time period, the thread has not emitted a write request whose critical quantity is greater than the second threshold.

4. The encryption detection device according to claim 3, characterised in that the neutralisation of a thread comprises at least one of the actions of the group which comprises: killing the thread, blocking the thread, insulating the thread.

5. The encryption detection device according to claim 1, characterised in that the statistical model of ordinary file header writing comprises a probability law, and in that the calculation of the first deviation quantity comprises the calculation of a likelihood relative to this probability law of the statistical model of ordinary file header writing.

6. The encryption detection device according to claim 5, characterised in that the probability law comprises a law of distribution of m-bit strings in the file headers of a predetermined corpus of files, where m is a strictly positive integer less than the maximum header size of the files of said predetermined corpus.

7. The encryption detection device according to claim 3, characterised in that the sentinel program is further arranged to:
calculate a quantification quantity of the randomness of the character string,
calculate a second deviation quantity, derived from the first deviation quantity and the quantification quantity of the randomness, and
repeat steps b) to e) using the second deviation quantity as critical quantity.

8. The encryption detection device according to claim 7, characterised in that calculating the quantification of the randomness comprises calculating a chi-square of a left truncation of the character string.

9. The encryption detection device according to claim 1, characterised in that it is applied as a countermeasure to ransomware software.

10. An encryption detection method, comprising the following operations:
a) providing a statistical model of ordinary header writing,
b) retrieving the write requests in a file, emitted by each thread, such requests comprising a character string to be written,
c) calculating a first deviation quantity according to the part of the character string relating to the header of the file and according to the statistical model of ordinary header writing, then
d) issuing a first warning if the first deviation quantity exceeds a first threshold.

* * * * *